US012506141B2

(12) United States Patent
Saito et al.

(10) Patent No.: US 12,506,141 B2
(45) Date of Patent: Dec. 23, 2025

(54) NEGATIVE ELECTRODE ACTIVE MATERIAL FOR SECONDARY BATTERIES, AND SECONDARY BATTERY USING SAME

(71) Applicant: PANASONIC INTELLECTUAL PROPERTY MANAGEMENT CO., LTD., Osaka (JP)

(72) Inventors: Yusuke Saito, Osaka Fu (JP); Naoki Seki, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 634 days.

(21) Appl. No.: 17/912,130

(22) PCT Filed: Jan. 19, 2021

(86) PCT No.: PCT/JP2021/001564
§ 371 (c)(1),
(2) Date: Sep. 16, 2022

(87) PCT Pub. No.: WO2021/199587
PCT Pub. Date: Oct. 7, 2021

(65) Prior Publication Data
US 2023/0111143 A1    Apr. 13, 2023

(30) Foreign Application Priority Data

Mar. 30, 2020  (JP) .................. 2020-061364

(51) Int. Cl.
H01M 4/36    (2006.01)
H01M 4/38    (2006.01)
(Continued)

(52) U.S. Cl.
CPC .......... *H01M 4/364* (2013.01); *H01M 4/386* (2013.01); *H01M 4/58* (2013.01);
(Continued)

(58) Field of Classification Search
None
See application file for complete search history.

(56) References Cited

U.S. PATENT DOCUMENTS 4,173,687 A     11/1979  McKaveney et al.
2017/0214041 A1  7/2017  Minami et al.
(Continued)

FOREIGN PATENT DOCUMENTS

CN   105594025 A   5/2016
CN   107112534 A   8/2017
(Continued)

OTHER PUBLICATIONS

Office Action dated Jan. 16, 2025, issued in counterpart CN Application No. 202180024438.1, with partial English translation. (11 pages).
(Continued)

Primary Examiner — Zhongqing Wei
(74) Attorney, Agent, or Firm — WHDA, LLP

(57) ABSTRACT

A negative electrode active material for a secondary battery includes a silicon-containing material. The silicon-containing material includes a lithium-ion conductive phase, silicon particles dispersed in the lithium-ion conductive phase, and particles containing vanadium dispersed in the lithium-ion conductive phase.

10 Claims, 2 Drawing Sheets

(51) Int. Cl.
*H01M 4/58* (2010.01)
*H01M 10/0525* (2010.01)
*H01M 50/46* (2021.01)
*H01M 4/02* (2006.01)

(52) U.S. Cl.
CPC ....... *H01M 10/0525* (2013.01); *H01M 50/46* (2021.01); *H01M 2004/027* (2013.01)

(56) References Cited

U.S. PATENT DOCUMENTS

| | | |
|---|---|---|
| 2017/0331108 A1 | 11/2017 | Minami et al. |
| 2018/0287148 A1 | 10/2018 | Akira et al. |
| 2020/0321611 A1 | 10/2020 | Uchiyama et al. |
| 2021/0057727 A1* | 2/2021 | Akira ................ H01M 10/0525 |

FOREIGN PATENT DOCUMENTS

| | | | |
|---|---|---|---|
| CN | 107863503 A | 3/2018 | |
| JP | 2013-086979 A | 5/2013 | |
| JP | 2014-056722 A | 3/2014 | |
| JP | 2014-120324 A | 6/2014 | |
| JP | WO2016-152505 A1 | 12/2017 | |
| WO | 2016/035290 A1 | 3/2016 | |
| WO | 2016/121320 A1 | 8/2016 | |
| WO | 2019/131724 A1 | 7/2019 | |
| WO | WO-2019151016 A1 * | 8/2019 | ........ H01M 10/0525 |

OTHER PUBLICATIONS

International Search Report dated Apr. 6, 2021, issued in counterpart Application No. PCT/JP2021/001564, with English Translation. (10 pages).

* cited by examiner

NEGATIVE ELECTRODE ACTIVE MATERIAL FOR SECONDARY BATTERIES, AND SECONDARY BATTERY USING SAME

CROSS-REFERENCE TO RELATED APPLICATION

This application is a National Phase Application filed under 35 U.S.C. § 371 of International Application No. PCT/JP2021/001564 filed on Jan. 19, 2021 which claims the benefit of priorities under 35 U.S.C. § 119 (a) of Japanese Patent Application No. 2020-061364 filed in Japan on Mar. 30, 2020, the contents of which are incorporated herein by reference.

TECHNICAL FIELD

The present disclosure mainly relates to a negative electrode active material for a secondary battery.

BACKGROUND ART

In recent years, secondary batteries, such as non-aqueous electrolyte secondary batteries, because of their high voltage and high energy density, have been expected as promising power sources for small consumer applications, power storage devices, and electric cars. With increasing demand for a higher battery energy density, a material containing silicon (Si) that forms an alloy with lithium has been expected to be utilized as a negative electrode active material having a high theoretical capacity density (e.g., Patent Literature 1).

The material containing silicon, however, shows significant expansion and contraction due to charge and discharge, and its capacity tends to decrease when the charge and discharge of the secondary battery are repeated.

To address this, Patent Literature 2 proposes a negative electrode active material for a non-aqueous electrolyte secondary battery, including a lithium silicate phase represented by $Li_{2z}SiO(2+z)$ where $0<z<2$, silicon particles dispersed in the lithium silicate phase, and metal particles dispersed in the lithium silicate phase and mainly composed of one or more metals or alloys selected from Fe, Pb, Zn, Sn, Cu, Ni and Cr.

CITATION LIST

Patent Literature

[PTL 1] International publication WO2016/35290
[PTL 2] International publication WO2016/121320

SUMMARY OF INVENTION

According to Patent Literature 2, in a non-aqueous electrolyte secondary battery including a silicon material as a negative electrode active material, the initial charge and discharge efficiency can be improved, and the cycle life can be prolonged. However, the effect of prolonging the cycle life is not sufficient, and further improvement is desired.

One aspect of the present disclosure relates to a negative electrode active material for a secondary battery, including: a silicon-containing material, the silicon-containing material including a lithium-ion conductive phase, silicon particles dispersed in the lithium-ion conductive phase, and particles containing vanadium dispersed in the lithium-ion conductive phase.

Another aspect of the present disclosure relates to a secondary battery, including: a positive electrode, a negative electrode, an electrolyte, and a separator interposed between the positive electrode and the negative electrode, wherein the negative electrode includes the above-described negative electrode active material for a secondary battery.

With a negative electrode active material according to the present disclosure, a secondary battery having excellent charge and discharge characteristics can be obtained.

DESCRIPTION OF EMBODIMENTS

Figure 1:
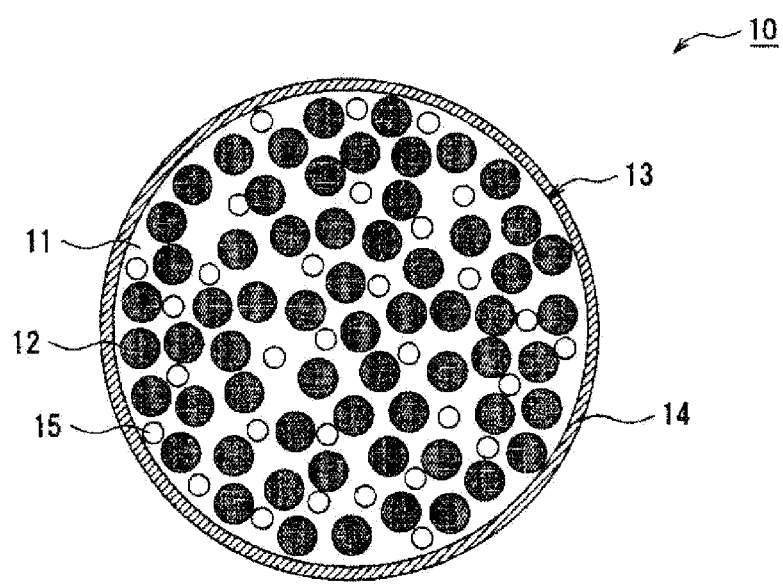
FIG. 1 A schematic cross-sectional view of a negative electrode active material (silicon-containing material) for a secondary battery according to one embodiment of the present disclosure.

A negative electrode active material for a secondary battery according to an embodiment of the present disclosure includes a silicon-containing material. The silicon-containing material includes a lithium-ion conductive phase, silicon particles dispersed in the lithium-ion conductive phase, and particles containing vanadium dispersed in the lithium-ion conductive phase.

The silicon-containing material has a sea-island structure. The silicon particles (islands) are dispersed in a matrix (sea) of the lithium-ion conductive phase and covered with the lithium-ion conductive phase. In the sea-island structure, the contacts between the silicon particles and the electrolyte are restricted, which can suppress side reactions. Furthermore, the stress caused by expansion and contraction of the silicon particles is relaxed by the matrix of the lithium-ion conductive phase.

Here, particles containing vanadium are dispersed in the lithium-ion conductive phase. Vanadium improves the strength of particles of the silicon-containing material. Vanadium is considered as forming highly hard microdomains within the lithium-ion conductive phase. Due to the presence of the highly hard microdomains uniformly distributed in the matrix of the lithium-ion conductive phase, the expansion and contraction of the silicon-containing material during charge and discharge can be suppressed, and the occurrence of cracks in the silicon-containing material, partial isolation of the silicon-containing material caused by collapse of the particles, and the like can also be suppressed. This can lead to a remarkable improvement in the cycle life of the secondary battery.

It is to be noted that by allowing iron to be dispersed in the lithium-ion conductive phase, too, the expansion of the silicon-containing material during charge and discharge can be suppressed, and the occurrence of cracks in the silicon-containing material particles and the collapse of the particles can also be suppressed. In order to obtain such an effect, it is necessary to contain a relatively large amount of iron in the lithium-ion conductive phase.

On the other hand, ion tends to react with silicon particles, causing a decrease in capacity. Vanadium, just by containing it in a smaller amount than that of iron in the lithium-ion conductive phase, can exhibit an effect of suppressing the expansion and contraction of the silicon-containing material due to charge and discharge and suppressing the occurrence of cracks in the silicon-containing material particles and the collapse of the particles.

The content of the vanadium in the silicon-containing material, for example, may be 1000 ppm or less, may be 500 ppm or less, may be 300 ppm or less, and may be 100 ppm or less. The content of the vanadium in the silicon-containing material is preferably 5 ppm or more, may be 10 ppm or more, and may be 30 ppm or more, in view of enhancing the effect of increasing the hardness of the lithium-ion conductive phase.

The content of the vanadium in the silicon-containing material can be measured, for example, by inductively coupled plasma atomic emission spectroscopy (ICP-AES). Specifically, a sample of the silicon-containing material is completely dissolved in a heated acid solution (a mixed acid of hydrofluoric acid, nitric acid and sulfuric acid), and the residue of dissolution, carbon, is removed by filtration. Then, the obtained filtrate is analyzed by ICP-AES, to measure a spectral intensity of vanadium. Subsequently, using a commercially available standard solution of the element, a calibration curve is drawn, from which the content of the vanadium is calculated.

In the particles containing vanadium, vanadium may be contained in at least one selected from the group consisting of a vanadium alloy and vanadium carbide. That is, the particles containing vanadium may be an alloy containing vanadium, vanadium carbide, or the like. In particular, vanadium carbide has a Vickers hardness of about 2800, and is effective in increasing the hardness of the lithium-ion conductive phase.

The particles containing vanadium may further contain iron. That is, the particles containing vanadium may be formed of an alloy containing vanadium and iron, or an alloy containing vanadium carbide and iron. In the alloy containing vanadium and iron, elemental vanadium and/or vanadium carbide may be contained in a dispersed state. Iron has excellent malleability, which can remarkably suppress the cracks and collapse of the silicon-containing material that may occur during repeated charge and discharge. Therefore, the cycle life can be considerably improved. Such an effect unique to iron is exhibited sufficiently, even though the amount of ion is reduced, when vanadium and iron are used in combination.

The content of the iron in the silicon-containing material, for example, may be 0.01 mass % or more and 10 mass % or less, and may be 0.1 mass % or more and 3 mass % or less.

The content of the iron in the silicon-containing material can be measured, for example, by ICP-AES in a similar manner to that of the vanadium. Specifically, a sample of the silicon-containing material is completely dissolved in a heated acid solution, and the residue of dissolution, carbon, is removed by filtration. Then, the obtained filtrate is analyzed by ICP-AES, to measure a spectral intensity of ion. Subsequently, using a commercially available standard solution of the element, a calibration curve is drawn, from which the content of the iron is calculated.

The silicon particles contained in the silicon-containing material may have an average particle diameter of, for example, 1 nm or more and 1000 nm or less. The average particle diameter of the silicon particles is preferably 500 nm or less, more preferably 200 nm or less, further more preferably 50 nm or less. That is, the silicon particles may be fine particles. The smaller the average particle diameter of the silicon particles is, the smaller the changes in volume during charge and discharge are, leading to improved structural stability. Furthermore, the expansion and contraction of the silicon particles are uniformalized, leading to suppressed cracking of the particles.

The average particle diameter of the silicon particles can be measured by observing a cross section of the silicon-containing material using a SEM or TEM. Specifically, the maximum diameters of any 100 silicon particles are measured and averaged.

The lithium-ion conductive phase may be, for example, at least one selected from the group consisting of a silicon oxide phase, a silicate phase, and a carbon phase. In particular, the silicate phase has a small irreversible capacity in the early stage of charge and discharge, and is suitable for obtaining a silicon-containing material with high capacity.

The silicon oxide phase contains silicon dioxide as its main component (e.g., 95 to 100 mass %). The composition of a composite material containing a silicon oxide phase and silicon particles dispersed therein, as a whole, can be represented by $SiO_x$. $SiO_x$ has a structure in which fine particles of silicon are dispersed in $SiO_2$ in an amorphous state. The content ratio x of oxygen to silicon is, for example, $0.5 \leq x \leq 2.0$, more preferably $0.8 \leq x \leq 1.5$.

The carbon phase can be composed of, for example, formless carbon with low crystallinity (i.e., amorphous carbon). The formless carbon, for example, may be hard carbon, may be soft carbon, or may be others.

The silicate phase can contain at least one selected from the group consisting of an alkali metal element and a Group II element. By containing such an element, the irreversible capacity of the silicate phase is more significantly reduced. In particular, a silicate phase containing lithium (hereinafter sometimes referred to as a lithium silicate phase) is preferred because of its small irreversible capacity and excellent initial charge and discharge efficiency. Examples of the alkali metal element and the Group II element that can be used include Li, K, Na, Mg, Ca, Sr, and Ba.

The silicate phase may further contain an element M other than alkali metal elements and Group II elements. Here, the element M can be, for example, at least one selected from the group consisting of B, Al, Zr, Nb, Ta, La, Y, Ti, P, Bi, Zn, Sn, Pb, Sb, Co, Er, F, and W.

The silicate phase preferably contains a lithium silicate represented by a formula: $Li_{2z}SiO_{2+z}$ where $0<z<2$. The lithium silicate is lightweight and has excellent lithium ion conductivity. The lithium silicate may be an oxide phase containing Li, Si and O, and may contain another element. The atomic ratio: O/Si of O to Si in the lithium silicate phase is, for example, greater than 2 and less than 4. Preferably, the O/Si is greater than 2 and less than 3. The atomic ratio: Li/Si of Li to Si in the lithium silicate phase is, for example, greater than 0 and less than 4. The symbol z preferably satisfies $0<z<1$, more preferably $z=1/2$.

When the lithium-ion conductive phase is a silicate phase, in view of achieving a higher capacity and improved cycle characteristics, the content of the silicon particles in the silicon-containing material is desirably, for example, 30 mass % or more and 80 mass % or less. By setting the content of the silicon particles to 30 mass % or more, the proportion occupied by the silicate phase is lowered, and the initial charge and discharge efficiency tends to be improved. By setting the content of the silicon particles to 80 mass % or less, the degree of expansion and contraction of the silicon-containing material during charge and discharge tends to be reduced. The content of the silicon particles in the silicon-containing material is preferably 40 mass % or more, more preferably 50 mass % or more.

The composition of the silicate phase can be analyzed by the following method. The composition analysis is desirably performed using the silicon-containing material or the negative electrode mixture layer in a discharged state. In view of eliminating the influence of the decomposition products of the electrolyte, the sample to be analyzed is desirably of the silicon-containing material in the battery before charge-discharge cycles or in the early stage of the cycles.

The contents of B, Na, K, and Al in the silicate phase can be determined, for example, by a quantitative analysis in accordance with JIS R3105 (1995) (analysis method for borosilicate glass). The Ca content can be determined by a quantitative analysis in accordance with JIS R3101 (1995) (analysis method of soda-lime glass).

The content of each element contained in the silicon-containing material can be measured, for example, by ICP-AES in a similar manner to that of vanadium. Specifically, a sample of the silicon-containing material is completely dissolved in a heated acid solution, and the residue of dissolution, carbon, is removed by filtration. Then, the obtained filtrate is analyzed by ICP-AES, to measure a spectral intensity of the each element. Subsequently, using a commercially available standard solution of the each element, a calibration curve is drawn, from which the content of the each element is calculated.

When analyzing the composition of the silicate phase, the silicon-containing material may be taken out from the battery, for example, in the following manner. Specifically, the battery is disassembled, to take out the negative electrode, which is then washed with anhydrous ethyl methyl carbonate or dimethyl carbonate to remove the electrolyte therefrom. Next, the negative electrode mixture layer is peeled off from the negative electrode current collector, and pulverized in a mortar, to obtain a sample powder. Next, the sample powder is dried in a dry atmosphere for 1 hour, and then immersed in a lightly-boiled 6M hydrochloric acid for 10 minutes, to remove alkali metals, such as Na and Li, that may have been contained in the binder and the like. Next, the sample powder is washed with ion-exchanged water, followed by separation by filtration, and then by drying at 200° C. for 1 hour. This is followed by heating in an oxygen atmosphere, to remove the carbon component. In this way, only the particles of the silicon-containing material can be isolated.

In the silicon-containing material, a silicate phase, silicon oxide phases, silicon particles, and the like can be present. By using Si-NMR, these can be distinguished from each other and quantified. The Si content obtained by ICP-AES as described above is the sum of the amount of Si constituting the silicon particles, the amount of Si in the lithium-ion conductive phase, and the amount of Si in the silicon oxide phases. On the other hand, the amount of Si constituting the silicon particles and the amount of Si in the silicon oxide phases can be determined separately using Si-NMR. Therefore, the amount of Si in the silicate phase can be determined by subtracting the amount of Si constituting the silicon particles and the amount of Si in the silicon oxide phases, from the Si content obtained by ICP-AES. For a standard substance necessary for quantification, a mixture containing a silicate whose Si content is already known and silicon particles in a predetermined ratio is used.

Desirable Si-NMR measurement conditions are shown below.
<Si-NMR Measurement Conditions>
Measuring apparatus: Solid nuclear magnetic resonance spectrometer (INOVA-400), available from Varian, Inc.
Probe: Varian 7 mm CPMAS-2
MAS: 4.2 kHz
MAS speed: 4 kHz
Pulse: DD (45° pulse+signal capture time 1H decoupling)
Repetition time: 1200 sec to 3000 sec
Observation width: 100 kHz
Observation center: around −100 ppm
Signal capture time: 0.05 sec
Accumulated number of times: 560
Sample amount: 207.6 mg The quantification of each element in the silicon-containing material can be done by SEM-EDX analysis, Auger electron spectroscopy (AES), laser ablation ICP mass spectrometry (LA-ICP-MS), X-ray photoelectron spectroscopy (XPS), or the like.

For example, quantification of each element in the silicon-containing material by SEM-EDX analysis can also be done by cross-sectional observation of the silicon-containing material on a cross section of the negative electrode mixture layer. The cross-sectional observation can be performed, for example, in the following manner. First, the battery is disassembled, to take out the negative electrode, and obtain a cross section of the negative electrode mixture layer using a cross section polisher (CP). The cross section of the negative electrode mixture layer is observed with a scanning electron microscope (SEM). From a cross-sectional image of the negative electrode mixture layer, 10 particles of the silicon-containing material having a maximum diameter of 5 μm or more are randomly selected, and an elemental mapping analysis by energy dispersive X-ray (EDX) is performed on each particle. The area containing a target element is calculated using an image analysis software. The observation magnification is desirably 2,000 to 20,000 times. The measured values of the area containing the predetermined element obtained for 10 particles are averaged.

In the process of charging and discharging, a surface film is formed on the silicon-containing material due to the decomposition of the electrolyte or other causes. Also, the silicon-containing material, in some cases, has a conductive layer at its surface. Therefore, the mapping analysis by EDX is performed on a region 1 μm or more inward from the peripheral edge of the cross section of the silicon-containing material so that the measurement range does not include the surface film or the conductive layer.

Desirable cross-sectional SEM-EDX analysis measurement conditions are shown below.
<SEM-EDX Measurement Conditions>
Processing apparatus: SM-09010 (Cross Section Polisher) available from JEOL
Processing conditions: accelerating voltage: 6 kV
Current value: 140 μA
Degree of vacuum: $1 \cdot 10^{-3}$ to $2 \cdot 10^{-3}$ Pa
Measuring apparatus: Electron microscope SU-70 available from HITACHI
Acceleration voltage during analysis: 10 kV
Field: Free mode
Probe current mode: Medium
Probe current range: High
Anode Ap.: 3
OBJ Ap.: 2
Analysis area: 1 μm square
Analysis software: EDAX Genesis
CPS: 20,500
Lsec: 50
Time constant: 3.2

The crystallite size of the silicon particles dispersed in the lithium-ion conductive phase is preferably 30 nm or less.

When the crystallite size of the silicon particles is 30 nm or less, the amount of volume change due to expansion and contraction of the silicon particles associated with charge and discharge can be reduced, and the cycle characteristics can be further improved. The crystallite size of the silicon particles is more preferably 2 nm or more and 30 nm or less, still more preferably 2 nm or more and 20 nm or less. When the crystallite size of the silicon particles is 20 nm or less, the expansion and contraction of the silicon particles can be uniformalized, and fine cracks in the particles due to expansion and contraction of the silicon particles during charge and discharge can be reduced, and the cycle characteristics can be improved.

The crystallite size of the silicon particles can be calculated from the Scherrer formula, using a half-width of a diffraction peak attributed to the Si (111) plane of an X-ray diffraction (XRD) pattern of the silicon particle.

At least part of the surface of the silicon-containing material may be coated with a conductive layer. By forming a conductive layer on the surface of the silicon-containing material, the conductivity of the silicon-containing material can be dramatically increased. As the conductive material constituting the conductive layer, a carbon material is preferred. The carbon material preferably includes at least one selected from the group consisting of a carbon compound and a carbonaceous material.

The thickness of the conductive layer is preferably thin enough not to substantially influence the average particle diameter of the silicon-containing material. The conductive layer has a thickness of preferably 1 to 200 nm, more preferably 5 to 100 nm, for securing the electrical conductivity and allowing for diffusion of lithium ions. The thickness of the conductive layer can be measured by cross-section observation of the silicon-containing material using a SEM or TEM (transmission electron microscope).

As the carbon compound, for example, a compound containing carbon and hydrogen, and a compound containing carbon, hydrogen, and oxygen are exemplified. As the carbonaceous material, formless carbon with low crystallinity, graphite with high crystallinity, and the like can be used. Examples of the formless carbon include carbon black, coal, coke, charcoal, and activated carbon. Examples of the graphite include natural graphite, artificial graphite, and graphitized mesophase carbon particles. Preferred is formless carbon, in terms of its low hardness and excellent buffering effect against the silicon particles whose volume changes during charge and discharge. The formless carbon may be graphitizable carbon (soft carbon) or non-graphitizable carbon (hard carbon). Examples of the carbon black include acetylene black and Ketjen black.

Next, an example of a method of producing a silicon-containing material will be described in detail. Here, a description is given of a case where silicon particles are dispersed in the lithium silicate phase.

Step (i)

A raw material mixture containing a Si raw material and a Li raw material in a predetermined ratio is used as a starting material of lithium silicate. To the raw material mixture, a vanadium raw material (e.g., vanadium carbide, vanadium iron alloy) is added. The raw material mixture may contain the aforementioned alkali metal element, Group II element, and/or element M. The raw material mixture is allowed to melt, and the melt is passed between metal rolls and formed into flakes, to prepare lithium silicate. Then, the silicate flakes are heat-treated at a temperature equal to or higher than the glass transition point and lower than the melting point in an air atmosphere, so that the flakes are crystallized. Note that the silicate flakes can be used without being crystallized. Silicate can be produced, without allowing the raw material mixture to melt, by baking it at a temperature lower than the melting point, to proceed solid phase reaction.

For the Si raw material, silicon oxide can be used. For the Li raw material, for example, lithium carbonate, lithium oxide, lithium hydroxide, lithium hydride, and the like can be used. These may be used singly or in combination of two or more kinds. Examples of the raw materials of the alkali metal element, Group II element, and element M include oxides, hydroxides, carbonate compounds, hydrides, nitrates, and sulfates of each element.

Step (ii)

Next, the lithium silicate is blended with raw material silicon, to form a composite. For example, through the following steps (a) to (c), a silicon-containing material composed of composite particles of lithium silicate and silicon particles (hereinafter sometimes referred to as silicate composite particles) is produced.

Step (a)

Powder of raw material silicon and powder of the lithium silicate are mixed at a mass ratio of, for example, 20:80 to 95:5. For the raw material silicon, coarse particles of silicon of about several μm to several tens of μm in average particle diameter can be used.

Step (b)

Next, using a pulverizer like a ball mill, the mixture of the raw material silicon and the lithium silicate, while being refined, is pulverized and formed into a composite. At this time, the mixture may be added with an organic solvent, and wet-pulverized. The organic solvent serves to prevent an object to be pulverized from adhering to the inner wall of the pulverizer.

Examples of the organic solvent include alcohols, ethers, fatty acids, alkanes, cycloalkanes, silicate esters, and metal alkoxides.

The raw material silicon and the lithium silicate may be separately refined into fine particles, and then mixed. Without using a pulverizer, silicon nanoparticles and amorphous lithium silicate nanoparticles may be produced and mixed. For producing nanoparticles, any commonly known method, such as a gas phase method (e.g., plasma method) or a liquid phase method (e.g., liquid phase reduction method) can be used.

Step (c)

Next, the mixture is heated, for example, under pressure to 600° C. to 1000° C. in an inert gas atmosphere (e.g., an atmosphere of argon, nitrogen, etc.), to be sintered. For sintering, a sintering apparatus capable of applying pressure in an inert atmosphere, such as a hot press, can be used. During sintering, the silicate softens and flows so as to fill the gaps between the silicon particles. As a result, a dense block-shaped sintered body including the silicate phase as the sea portion and the silicon particles as the island portions can be obtained. By pulverizing the obtained sintered body, silicate composite particles can be obtained.

Step (iii)

Subsequently, at least part of the surface of the composite particles may be coated with an electrically conductive material, to form a conductive layer. Examples of the method for coating the surface of the composite particles with a conductive carbon material include: a CVD method using a hydrocarbon gas, such as acetylene and methane, as a raw material; and a method in which coal pitch, petroleum pitch, phenolic resin, or the like is mixed with the composite particles and heated at 700° C. to 950° C. in an inert atmosphere (e.g., an atmosphere of argon, nitrogen), to be carbonized. Carbon black may be allowed to adhere to the surface of the composite particles.

Step (iv)

A step of washing the composite particles (including when having a conductive layer at the surface) with an acid may be performed. For example, by washing the composite particles with an acidic aqueous solution, a very small amount of alkaline component that may occur when the raw material silicon and lithium silicate are formed into a composite can be dissolved and removed. Examples of the acidic aqueous solution include: an aqueous solution of an inorganic acid, such as hydrochloric acid, hydrofluoric acid, sulfuric acid, nitric acid, phosphoric acid, and carbonic acid; and an aqueous solution of an organic acid, such as citric acid and acetic acid.

FIG. 1 schematically illustrates a cross section of a silicate composite particle 10 coated with a conductive layer, as an example of the silicon-containing material.

A silicate composite particle (base particle) 13 includes a lithium silicate phase 11, and silicon particles 12 dispersed in the lithium silicate phase 11. The silicate composite particle (base particle) 13 has a sea-island structure in which the fine silicon particles 12 are dispersed in a matrix of the lithium silicate phase 11. In the matrix of the lithium silicate phase 11, particles 15 containing vanadium are also dispersed. The particles 15 containing vanadium are usually smaller in average particle diameter than the silicon particles 12. The surface of the base particle 13 is coated with a conductive layer 14.

The average particle diameter of the particles 15 containing vanadium is measured by observing a cross section of the silicon-containing material using a SEM or TEM. Specifically, the maximum diameters of any 100 particles containing vanadium are measured and averaged.

In the lithium silicate phase 11, silicon oxide phases can be dispersed. The $SiO_2$ content in the silicate composite particle (base particle) 13 as measured by Si-NMR is preferably, for example, 30 mass % or less, more preferably less than 7 mass %. The silicate composite particle (base particle) 13 may contain another component, in addition to the above components. For example, a carbon material, an oxide such as $ZrO_2$, and a reinforcing material such as a carbide may be contained in an amount of less than 10 mass %, relative to the base particle 13.

Next, a secondary battery according to an embodiment of the present disclosure includes a positive electrode, a negative electrode, an electrolyte, and a separator interposed between the positive electrode and the negative electrode. The negative electrode includes a negative electrode mixture layer containing a negative electrode active material including the silicon-containing material. A description will be given below of the negative electrode, the positive electrode, the electrolyte, and the separator included in the secondary battery according to an embodiment of the present disclosure.

[Negative Electrode]

The negative electrode includes, for example, a negative electrode current collector, and a negative electrode mixture layer formed on a surface of the negative electrode current collector and containing a negative electrode active material. The negative electrode mixture layer can be formed by applying a negative electrode slurry of a negative electrode mixture dispersed in a dispersion medium onto a surface of the negative electrode current collector, followed by drying. The applied film after drying may be rolled, if necessary.

The negative electrode mixture contains a negative electrode active material including the aforementioned silicon-containing material as an essential component, and can contain a binder, a conductive agent, a thickener, and the like, as optional components. The silicon particles in the silicon-containing material can absorb many lithium ions, and therefore, a high-capacity negative electrode can be obtained.

The negative electrode active material may further include another active material that electrochemically absorb and release lithium ions. As the other active material, for example, a carbon-based active material is preferred. The silicon-containing material expands and contracts in volume in association with charge and discharge. When the proportion of the silicon-containing material occupying the negative electrode active material is increased, a contact failure between the negative electrode active material and the negative electrode current collector tends to occur in association with charge and discharge. However, by using the silicon-containing material in combination with a carbon-based active material, excellent cycle characteristics can be achieved, while a high capacity of the silicon particles can be imparted to the negative electrode. The ratio of the silicon-containing material to the total of the silicon-containing material and the carbon-based active material is for example, preferably 0.5 to 15 mass %, more preferably 1 to 5 mass %. In this case, a higher capacity and improved cycle characteristics can be both likely achieved.

Examples of the carbon-based active material include graphite, graphitizable carbon (soft carbon), and non-graphitizable carbon (hard carbon). In particular, preferred is graphite, in terms of its excellent stability during charge and discharge and small irreversible capacity. The graphite means a material having a graphite-like crystal structure, examples of which include natural graphite, artificial graphite, and graphitized mesophase carbon particles. The carbon-based material may be used singly or in combination of two or more kinds.

Examples of the negative electrode current collector include a non-porous conductive substrate (e.g., metal foil) and a porous conductive substrate (e.g., mesh, net, punched sheet). The negative electrode current collector may be made of, for example, stainless steel, nickel, a nickel alloy, copper, or a copper alloy.

Examples of the binder include fluorocarbon resin, polyolefin resin, polyamide resin, polyimide resin, vinyl resin, styrene-butadiene copolymer rubber (SBR), polyacrylic acid and derivatives thereof. These may be used singly or in combination of two or more kinds.

Examples of the conductive agent include carbon black, conductive fibers, fluorinated carbon, and organic conductive materials. These may be used singly or in combination of two or more kinds.

Examples of the thickener include carboxymethyl cellulose (CMC), and polyvinyl alcohol. These may be used singly or in combination of two or more kinds.

Examples of the dispersion medium include water, alcohols, ethers, N-methyl-2-pyrrolidone (NMP), and mixed solvents of these.

[Positive Electrode]

The positive electrode includes, for example, a positive electrode current collector, and a positive electrode mixture layer formed on a surface of the positive electrode current collector. The positive electrode mixture layer can be formed by applying a positive electrode slurry of a positive electrode mixture dispersed in a dispersion medium onto a surface of the positive electrode current collector, followed by drying. The applied film after drying may be rolled, if necessary.

The positive electrode mixture includes a positive electrode active material as an essential component, and may further include a binder, a conductive agent, and the like, as optional components.

The positive electrode active material may be a lithium composite metal oxide. Examples of the lithium composite metal oxide include $Li_aCoO_2$, $Li_aNiO_2$, $Li_aMnO_2$, $Li_a\text{-}CO_bNi_{1-b}O_2$, $Li_aCO_bM_{1-b}O_c$, $Li_aNi_{1-b}M_bO_c$, $Li_aMn_2O_4$, $Li_aMn_{2-b}MbO_4$, $LiMePO_4$, $Li_2MePO_4F$. Here, M represents at least one selected from Na, Mg, Sc, Y, Mn, Fe, Co, Ni, Cu, Zn, Al, Cr, Pb, Sb, and B. Me includes at least one transition element (e.g., at least one selected from the group consisting of Mn, Fe, Co, and Ni). Here, $0 \le a \le 1.2$, $0 \le b \le 0.9$, and $2.0 \le c \le 2.3$. The value a representing the molar ratio of lithium is a value immediately after the preparation of the active material and is subjected to increase and decrease during charge and discharge.

Examples of the binder and the conductive agent may be like those exemplified for the negative electrode. Additional examples of the conductive agent include graphite, such as natural graphite and artificial graphite.

For the positive electrode current collector, a conductive substrate conforming to the negative electrode current collector can be used. The positive electrode current collector may be made of, for example, stainless steel, aluminum, an aluminum alloy, and titanium.

[Electrolyte]

The electrolyte contains a solvent, and a lithium salt dissolved in the solvent. The concentration of the lithium salt in the electrolyte is, for example, 0.5 to 2 mol/L. The electrolyte may contain a commonly known additive.

The solvent may be aqueous or non-aqueous. The non-aqueous solvent may be, for example, a cyclic carbonic acid ester, a chain carbonic acid ester, or a cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The non-aqueous solvent may be used singly, or in combination of two or more kinds.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_3$, $LiCF_3CO_2$), a lithium salt of a fluorine-containing acid imide (e.g., $LiN(CF_3SO_2)_2$, $LiN(CF_3SO_2)(C_4F_9SO_2)$, $LiN(C_2F_5SO_2)_2$), and a lithium halide (e.g., LiCl, LiBr, LiI). The lithium salt may be used singly or in combination of two or more kinds.

[Separator]

It is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

The secondary battery, for example, has a structure in which an electrode group formed by winding the positive electrode and the negative electrode with the separator interposed therebetween is housed in an outer body, together with the electrolyte. The wound-type electrode group may be replaced with a different form of electrode group, for example, a stacked-type electrode group formed by stacking the positive electrode and the negative electrode with the separator interposed therebetween. The secondary battery may be in any form, such as cylindrical type, prismatic type, coin type, button type, or laminate type.

Figure 2:
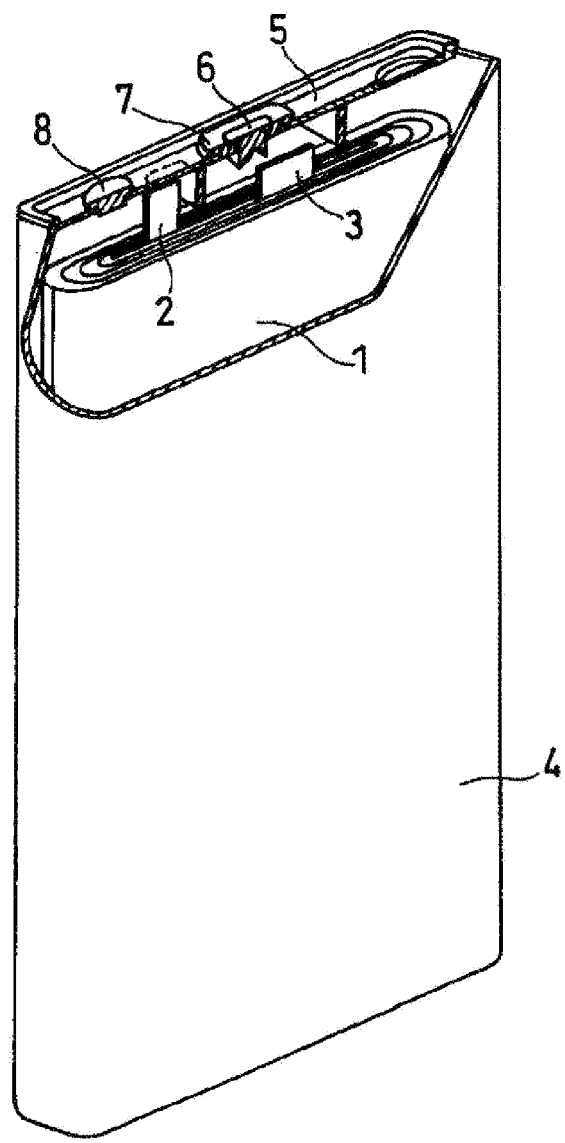
FIG. 2 A partially cut-away schematic oblique view of a secondary battery according to one embodiment of the present disclosure.

FIG. 2 is a schematic partially cut-away oblique view of a prismatic secondary battery according to one embodiment of the present disclosure.

The battery includes a bottomed prismatic battery case 4, and an electrode group 1 and an electrolyte (not shown) housed in the battery case 4, and a sealing plate 5 sealing the opening of the battery case 4. The electrode group 1 has a long negative electrode, a long positive electrode, and a separator interposed therebetween. The sealing plate 5 has a liquid inlet closed with a sealing plug 8, and a negative electrode terminal 6 insulated from the sealing plate 5 by a gasket 7.

A negative electrode lead 3 is attached at its one end to the negative electrode current collector, by means of welding or the like. A positive electrode lead 2 is attached at its one end to the positive electrode current collector, by means of welding or the like. The negative electrode lead 3 is electrically connected at its other end to the negative electrode terminal 6. The positive electrode lead 2 is electrically connected at its other end to the sealing plate 5.

The present disclosure will be specifically described below with reference to Examples and Comparative Examples. It is to be noted, however, the present invention is not limited to the following Examples.

Example 1

[Synthesis of Lithium Silicate]

Lithium carbonate and silicon dioxide were mixed in a molar ratio of $Li_2CO_3:SiO_2=34:66$. The mixture was allowed to melt at 1500° C. for 5 hours in an inert gas atmosphere. The melt was passed between metal rolls and formed into flakes, and then heat-treated at 750° C. for 5 minutes, to give lithium silicate ($Li_2Si_2O_5$). The lithium silicate was pulverized to have an average particle diameter of 10 μm.

[Preparation of Silicon-Containing Material]

In an inert atmosphere, Si powder (3N, average particle diameter: 10 μm) and $Li_2Si_2O_5$ powder (average particle diameter: 10 μm) were mixed in a mass ratio of 58:42, and a predetermined amount of particles of a vanadium-iron alloy containing elementary vanadium and vanadium carbide in a dispersed state were added thereto, which were packed into a pot (made of SUS, volume: 500 mL) of a planetary ball mill (P-5, available from Fritsch Co., Ltd.). Then, 24 SUS balls (diameter: 20 mm) were put in the pot, and with the lid closed, the mixture was pulverized at 200 rpm for 50 hours. Thereafter, the powder was taken out in an inert atmosphere and heat-treated at 800° C. for 4 hours in an inert atmosphere. Silicate composite particles containing 30 ppm of vanadium and 1.3 mass % of iron were thus obtained as a silicon-containing material A1.

The silicon-containing material A1 was pulverized and passed through a 40-μm mesh, and then mixed with coal pitch (MCP 250, available from JFE Chemical Corporation). The mixture was heat-treated at 800° C. in an inert atmosphere, to coat the silicon-containing material A1 with carbon, to form a conductive layer. The coating amount of the carbon was approximately 5 mass %, relative to the total of the silicon-containing material A1 and the conductive layer.

Thereafter, using a sieve, a silicon-containing material A1 of 5 μm in average particle diameter having a conductive layer was obtained.

[Analysis of Silicon-Containing Material]

A TEM observation of a cross section of the silicon-containing material A1 found that the average particle diameter of Si particles was less than 50 nm. A SEM observation of a particle cross section of the silicon-containing material A1 confirmed that Si particles and powder containing vanadium carbide were dispersed substantially uniformly in the silicate phase.

In an XRD pattern of the silicon-containing material A1, peaks derived from Si and $Li_2Si_2O_5$ were confirmed. No peak of $SiO_2$ was observed at $2\theta=25°$.

The silicon-containing material A1 was analyzed by Si-NMR. The result found that the content of $SiO_2$ was below the lower limit of detection.

The content of vanadium and iron were determined by ICP-AES.

[Production of Negative Electrode]

A mixture containing the silicon-containing material A1 having a conductive layer and graphite in a weight ratio of 5:95, a sodium salt of carboxymethyl cellulose (CMC-Na), and styrene-butadiene rubber (SBR) were mixed in a mass ratio of 97.5:1.0:1.5, to which water was added. The mixture was stirred in a mixer (T.K. HIVIS MIX, available from PRIMIX Corporation), to prepare a negative electrode slurry. Next, the negative electrode slurry was applied onto both surface of copper foil. The applied films were dried, then rolled, and thus, a negative electrode A2 in which a negative electrode mixture layer having a density of 1.6 g/cm³ was formed on both sides of the copper foil was obtained.

[Production of Positive Electrode]

Lithium cobaltate, acetylene black, and polyvinylidene fluoride were mixed in a mass ratio of 95:2.5:2.5, to which N-methyl-2-pyrrolidone (NMP) was added. The mixture was stirred in a mixer (T.K. HIVIS MIX, available from PRIMIX Corporation), to prepare a positive electrode slurry. Next, the positive electrode slurry was applied onto both surfaces of aluminum foil. The applied films were dried, then rolled, and thus, a positive electrode in which a positive electrode mixture layer having a density of 3.6 g/cm³ was formed on both sides of the aluminum foil was obtained.

[Preparation of Non-Aqueous Electrolyte Solution]

In a mixed solvent containing ethylene carbonate (EC) and ethyl methyl carbonate (EMC) in a volume ratio of 3:7, $LiPF_6$ was dissolved at concentration of 1.0 mol/L, to prepare a non-aqueous electrolyte solution.

[Fabrication of Secondary Battery]

The positive electrode and the negative electrode, with a tab attached to each electrode, were wound spirally with a separator interposed therebetween such that the tabs were positioned at the outermost layer, thereby to form an electrode group. The electrode group was inserted into an outer body made of aluminum laminate film and dried under vacuum at 105° C. for 2 hours. The non-aqueous electrolyte solution was injected, and the opening of the outer body was sealed. A secondary battery A1 was thus obtained.

Comparative Example 1

A negative electrode R1 and a secondary battery R1 were obtained in the same manner as in Example 1, except that vanadium carbide was not added to the mixture of Si powder and $Li_2Si_2O_5$ powder, and iron was added, to synthesize silicate composite particles containing 1.7 mass % of iron (silicon-containing material R1).

[Evaluation]

(Cycle Life)

With respect to each of the batteries of Example 1 and Comparative Example 1, charging and discharging were repeated under the following conditions, to evaluate the cycle life.

<Charging>

At 25° C., a constant-current charging was performed at a current of 1 It (800 mA) until the voltage reached 4.2 V, and then, a constant-voltage charging was performed at a voltage of 4.2 V until the current reached 1/20 It (40 mA).

<Discharging>

At 25° C., a constant-current discharge was performed at a current of 1 It (800 mA) until the voltage reached 2.75 V.

The rest period between charging and discharging was set to 10 minutes. The number of cycles performed until the discharge capacity reached 80% of that at the 1st cycle was measured as the cycle life. The results are shown in Table 1.

TABLE 1

| Battery | V | Fe | Cycle life |
|---|---|---|---|
| A1 | 300 ppm | 1.3 mass % | 359 |
| R1 | — | 1.7 mass % | 333 |

It would be understood from Table 1 that when particles containing vanadium are dispersed in the lithium-ion conductive phase, the cycle life can be significantly improved, as compared to when iron is dispersed in the lithium-ion conductive phase.

INDUSTRIAL APPLICABILITY

The negative electrode for a secondary battery according to the present disclosure is useful in a secondary battery that serves as a main power source for mobile communication devices, portable electronic devices, and other similar devices.

REFERENCE SIGNS LIST 1 electrode group
2 positive electrode lead
3 negative electrode lead
4 battery case
5 sealing plate
6 negative electrode terminal
7 gasket
8 sealing plug
10 silicate composite particle having conductive layer
11 lithium silicate phase
12 silicon particle
13 silicate composite particle (base particle)
14 conductive layer
15 particle containing vanadium

The invention claimed is:

1. A negative electrode active material for a secondary battery, comprising:
 a silicon-containing material,
 the silicon-containing material including a lithium-ion conductive phase, silicon particles dispersed in the lithium-ion conductive phase, and particles containing vanadium dispersed in the lithium-ion conductive phase, wherein a content of the vanadium in the silicon-containing material is 1000 ppm by weight or less.

2. The negative electrode active material for a secondary battery according to claim 1, wherein the particles containing vanadium include at least one selected from the group consisting of a vanadium alloy and vanadium carbide.

3. The negative electrode active material for a secondary battery according to claim 1, wherein the particles containing vanadium contain iron.

4. The negative electrode active material for a secondary battery according to claim 3, wherein a content of the iron in the silicon-containing material is 0.01 mass % or more and 10 mass % or less.

5. The negative electrode active material for a secondary battery according to claim 1, wherein the silicon particles have an average particle diameter of 1 nm or more and 1000 nm or less.

6. The negative electrode active material for a secondary battery according to claim 1, wherein the lithium-ion conductive phase is at least one selected from the group consisting of a silicon oxide phase, a silicate phase, and a carbon phase.

7. The negative electrode for a secondary battery according to claim 6, wherein
the lithium-ion conductive phase includes the silicate phase, and
the silicate phase contains at least one selected from the group consisting of an alkali metal element and a Group II element of a periodic table of elements.

8. The negative electrode for a secondary battery according to claim 7, wherein
the silicate phase further contains an element M, and
the element M is at least one selected from the group consisting of B, Al, Zr, Nb, Ta, La, Y, Ti, P, Bi, Zn, Sn, Pb, Sb, Co, Er, F, and W.

9. The negative electrode for a secondary battery according to claim 6, wherein the silicate phase includes a lithium silicate represented by a formula: $Li_{2z}SiO_{2+z}$ where $0<z<2$.

10. A secondary battery, comprising:
a positive electrode, a negative electrode, an electrolyte, and a separator interposed between the positive electrode and the negative electrode, wherein
the negative electrode includes the negative electrode active material for a secondary battery of claim 1.

* * * * *